US012795332B2

(12) United States Patent
Lutsky

(10) Patent No.: US 12,795,332 B2
(45) Date of Patent: Nov. 10, 2026

(54) HIGH ACCURACY ORAN RADIO UNIT SYNCHRONIZATION ERROR ESTIMATION

(71) Applicant: TEOM Inc., Scottsdale, AZ (US)

(72) Inventor: Vitaly Lutsky, Rosh Haayin (IL)

(73) Assignee: TEOM Inc., Scottsdale, AZ (US)

( * ) Notice: Subject to any disclaimer, the term of this patent is extended or adjusted under 35 U.S.C. 154(b) by 121 days.

(21) Appl. No.: 19/007,897

(22) Filed: Jan. 2, 2025

(65) Prior Publication Data

US 2025/0211945 A1 Jun. 26, 2025

Related U.S. Application Data

(63) Continuation of application No. 17/659,051, filed on Apr. 13, 2022, now Pat. No. 12,231,989.

(60) Provisional application No. 63/174,219, filed on Apr. 13, 2021.

(51) Int. Cl.
*H04W 4/029* (2018.01)
*G01S 5/02* (2010.01)
*H04W 56/00* (2009.01)

(52) U.S. Cl.
CPC ........... *H04W 4/029* (2018.02); *G01S 5/0218* (2020.05); *G01S 5/02216* (2020.05); *G01S 5/0294* (2013.01); *H04W 56/006* (2013.01)

(58) Field of Classification Search
CPC . H04W 4/029; H04W 56/006; G01S 5/02216; G01S 5/0218; G01S 5/0294
See application file for complete search history.

(56) References Cited

U.S. PATENT DOCUMENTS

2023/0288524 A1* 9/2023 Yerramalli ............ G01S 5/0036

OTHER PUBLICATIONS

D'Souza et al., "Information formulation of the UDU Kalman filter." IEEE transactions on aerospace and electronic systems 55.1 (2018), 8 pages.
Dwivedi et al., "Positioning in 5G networks." IEEE Communications Magazine 59.11, published on Feb. 5, 2021, 7 pages.
Koivisto et al., "Joint 3D Positioning and Network Synchronization in 5G Ultra-Dense Networks Using UKF and EKF," 2016 IEEE Globecom Workshops (GC Wkshps), published Aug. 2016, 7 pages.
(Continued)

*Primary Examiner* — Jirapon Tulop
(74) *Attorney, Agent, or Firm* — Cozen O'Connor

(57) ABSTRACT

Systems, methods, and software can provide high-accuracy position estimation for mobile user equipment (UE) configured for use within a service area covered by a plurality of radio units, e.g., O-RUs, with known position including coordinates. A channel estimate can be derived for a channel between a given UE and each of a plurality of radio units based on a sounding reference signal (SRS) received from the UE and used to select a subset of the radio units. The shortest delay can be calculated for the given UE to each O-RU in the subset, forming a set of uplink-time-difference-of-arrival (UL-TDOA) measurements; position of the given UE in the service area can be estimated based on the UL-TDOA measurements. The O-RU synchronization error can be estimated for each O-RU in the subset using estimated positions of the given UE and corresponding UL-TDOA measurements.

23 Claims, 6 Drawing Sheets

(56) References Cited

OTHER PUBLICATIONS

Notice of Allowance for U.S. Appl. No. 17/659,051, mailed Dec. 11, 2024, 9 pages.
Ruffini et al., “56 synchronization requirements and solutions.”, Ericsson Technology Review, published on Jan. 13, 2021, 14 pages.

* cited by examiner

HIGH ACCURACY ORAN RADIO UNIT SYNCHRONIZATION ERROR ESTIMATION

CROSS REFERENCE TO RELATED APPLICATION

This application is a continuation of U.S. patent application Ser. No. 17/659,051 filed on 13 Apr. 2022, which claims priority to and benefit of U.S. Provisional Application No. 63/174,219 filed 13 Apr. 2021 and entitled "High Accuracy O-RU Synchronization Error Estimation," both of which applications are incorporated herein by reference in their entireties.

BACKGROUND

Wireless cellular communication networks typically rely on a defined air-interface standard for the link between a base station and a mobile station (e.g., "user equipment" or "cell phone"). Air-interface standards, such as the 4G LTE and 5G standards written and promulgated by the $3^{rd}$ Generation Partnership project (3GPP), include synchronization requirements for the associated radio access network (RAN).

The 5G specification (starting with Rel. 15), describes a RAN architecture, where the upper and lower parts of the 5G New Radio (NR) RAN are separated into different logical units: the centralized unit (CU), the distributed unit (DU) and the radio unit (RU). The baseband function in a base station is split into two logical units: a CU hosting the higher-layer protocols and a DU handling the lower layers to the user equipment (UE). See Rel. 15.

The O-RAN specifications, written and promulgated by the O-RAN Alliance, complement the 3GPP 5G specifications by defining interface profiles, additional new open interfaces, and new nodes. In the O-RAN specifications, the gNB is split into a Central Unit (CU), a Distributed Unit (DU), and a Radio Unit (RU) (called O-CU, O-DU, and O-RU in O-RAN specifications). The CU is further split into two logical components, one for a Control Plane (CP), and one for a User Plane (UP). Relative to 5G, O-RAN opens up the 5G base station in more functional elements (e.g., the RU) and standardizes new interfaces like for the fronthaul, management and control functions and interfaces for O-RAN functions and virtualization for the covered functions. O-RAN can accordingly be considered as an extension of the 3GPP 5G standard, both in terms of network functions aspects and network implementation aspects (e.g., virtualization).

Timing based techniques have been used for base-station assisted positioning estimation in cellular wireless networks. Timing based techniques can take advantage of known propagation speed of the signals to calculate the distance of the user equipment (UE), e.g., mobile station, that supports one or more air-interface stands such as 4G, 5G, from each radio unit (RU) receiving a sounding reference signal (SRS) signal.

UE synchronization error is one source of positioning error for determining UE position since is forms a component of the uncertainty of the transmission start on the UE side. Another component of the uncertainty is the synchronization error between multiple radio units (RUs) of a base station or of multiple base stations.

SUMMARY

One aspect of the present disclosure includes a system for providing high-accuracy position estimation for mobile user equipment (UE) configured for use within a service area covered by a plurality of ORAN radio units (O-RUs) with known position including coordinates. The system can include a memory including computer-executable instructions. The system can include a processor coupled to the memory and operative to execute the computer-executable instructions, the computer-executable instructions configured to cause the processor to, derive a channel estimate for a channel between a given UE and each of a plurality of O-RUs based on a sounding reference signal (SRS) received from the UE; select a subset of the O-RUs based on a selection criterion for the respective channel estimates; calculate the shortest delay for the given UE in a multipath environment to each O-RU in the subset, forming a set of uplink-time-difference-of-arrival (UL-TDOA) measurements representing the shortest delays to the O-RUs in the subset; estimate position of the given UE in the service area based on the UL-TDOA measurements; and estimate O-RU synchronization error for each O-RU in the subset using estimated positions of the given UE and corresponding UL-TDOA measurements. Other embodiments of this aspect can include corresponding computer systems, apparatus, and computer programs recorded on one or more computer storage devices, each configured to perform the actions of the methods.

Implementations may include one or more of the following features. The computer-executable instructions can include a super resolution algorithm for calculating the shortest delay for the given UE in a multipath environment to each O-RU in the subset. The processor can be further configured to implement an unscented Kalman filter (UKF) for determining synchronization error. The UKF can be provided with inputs including (i) the UL-TDOA measurements for the UE and the subset of O-RUs in the subset, respectively, (ii) the coordinates of the O-RUs in the subset, and (iii) position estimation of UE or position of the UE in predefined position that operates in the subset of O-RUs for which the UL-TDOA measurements are provided. Implementing the UKF may include implementing a state vector and state vector initialization stage. Implementing the UKF may include calculation of sigma points. Implementing the UKF may include implementing a forecast stage. Implementing the UKF may include implementing an observation stage. Implementing the UKF may include implementing a data assimilation stage.

The synchronization error can be determined, in exemplary embodiments, within a range of, e.g., of about 1 ns to about 100 ns. The O-RUs can be connected to ORAN distributed units (O-DUs) as part of a UE position estimation framework using an ORAN fronthaul interface. The SRS may include a 3gpp NR/LTE uplink (UL) SRS. The O-RU can be part of a UL-TDOA pairing for UE position estimation. The system may include a position estimation framework including one or more ORAN distributed units (O-DUs), each connected to one or more O-RUs. The system may include a gNB or eNB architecture configured to provide a service area for the plurality of UEs. The system may include selecting a subset of the plurality of O-RUs based on a selection criterion for determining position of the UE. The selection criterion may include signal-to-noise ratio (SNR). The channel estimate may include one or more channel parameters. The processor can be connected to or disposed in a gNB or eNB. The plurality of O-RUs can be connected to a common synchronization master clock. The computer-executable instructions can cause the processor to remove the (determined) O-RU synchronization error from the UL-TDOA measurements for determination of UE position. A further aspect of the present disclosure is directed to and provides an UKF $\Delta\tau_{RU_i}$ tracker based on TDOA measurements estimated coordinates of UEs and known location of the O-RUs.

Exemplary embodiments of the present disclosure provide can provide for estimation or tracking of the error $\Delta\tau_{RU_i}$ with high estimation accuracy for error values. In some embodiments, the error $\Delta\tau_{RU_i}$ can be tracked or estimated over a range from, e.g., about 1 nsec to about 100 ns, or about 1 ns up to about 2500 ns is some other embodiments, and/or provide an ability to estimate the location of a UE with meter or sub-meter accuracy.

Implementations of the described techniques may include hardware, a method or process, or computer software on a computer-accessible medium. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus (e.g., one or more processors), cause the apparatus to perform the actions.

BRIEF DESCRIPTION OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Furthermore, embodiments are illustrated by way of example and not limitation in the figures, in which.

DETAILED DESCRIPTION

Figure 1:
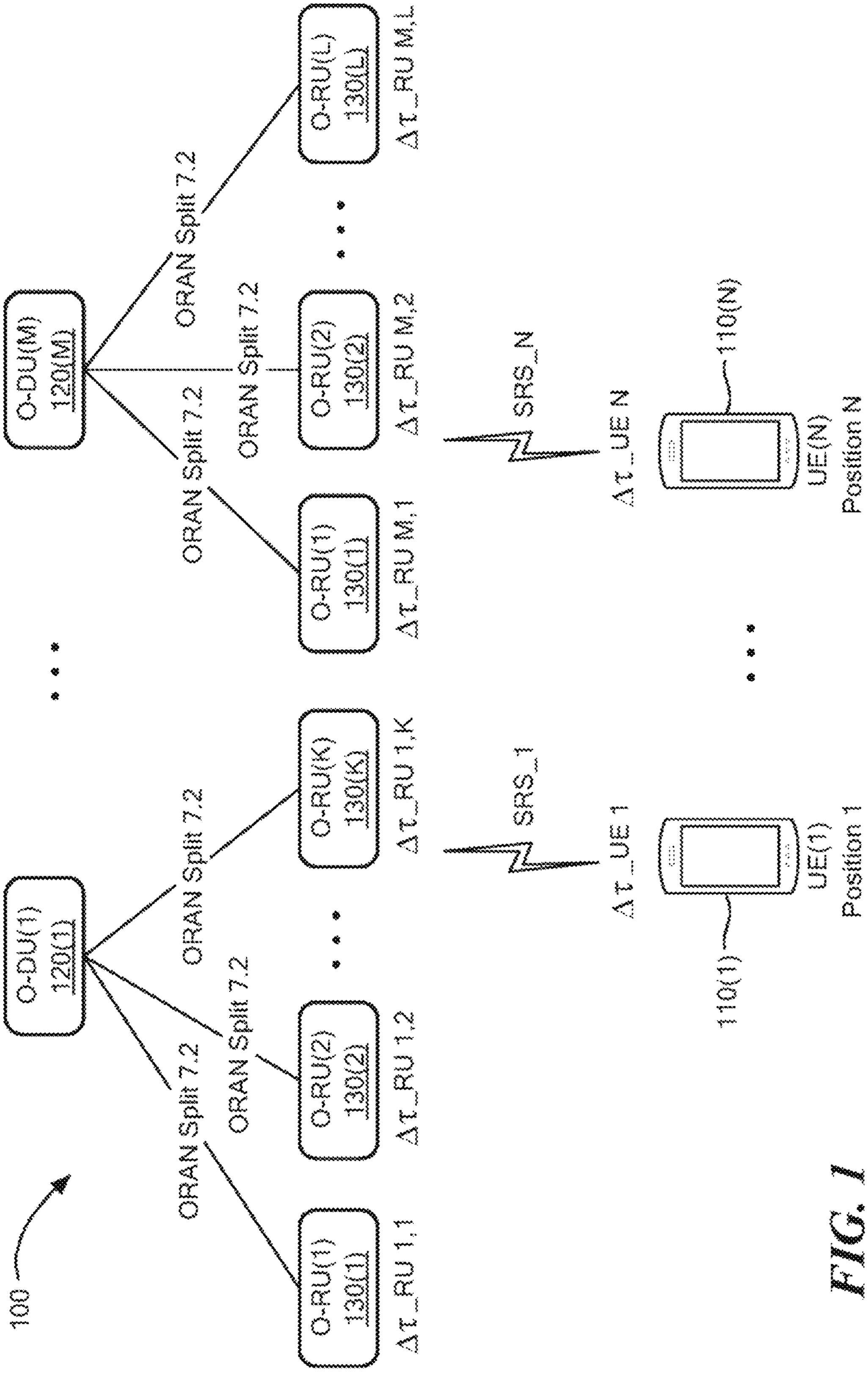
FIG. 1 is a diagram of an example of a positioning framework including a plurality of base station (gNBs/eNBs) radio units (O-DUs and O-RUs), in accordance with the present disclosure.

The following acronyms and initializations are used herein:

gNB: 5G NR base station;

eNB: LTE base station;

UE: User Equipment—a mobile device supporting 5G NR/LTE air interface;

UL: Uplink;

O-RU: radio unit gNB/eNB air interface unit which transmits and receives signals;

O-DU: distributed unit part of base station (gNB/eNB) which includes processing parts between Split 2 and Split 7.2;

ORAN: Open Radio Access Network (RAN) consortium;

UL-TDOA: Uplink Time Difference of Arrival method; and

SRS: sounding reference signal transmitted by UE according to 3GPP definitions for 5G New Radio (NR)/4G LTE.

Prior to describing example aspects and embodiments of the disclosure, the following information is provided for context.

Timing based techniques have been used for base station (e.g., gNB/eNB) assisted positioning estimation. Timing based techniques can take advantage of known propagation speed of the signals to calculate the distance of the UE from each RU receiving SRS signal. For example, in 3GPP specification for 5G, the sounding reference signal (SRS) has been agreed to be used in the uplink (UL) for positioning purposes. See 3GPP 38.211, "NR; Physical channels and modulation," Rel 16; and 3GPP 36.211, "Evolved Universal Terrestrial Radio Access (E-UTRA); Physical channels and modulation," the entire content of each of which is incorporated herein by reference.

Time Difference of Arrival (TDOA) Measurements:

To estimate the location of the UE based only on UL received signal in gNB/eNB or gNBs/eNBs, an Uplink Time Difference of Arrival (UL-TDOA) method can be used. This method calculates received time of arrival in RUs with known position and estimates the location of the UE by using timing difference of arrival between O-RUs. The purpose of calculating the time difference is to eliminate or remove the uncertainty of the transmission start on UE side which is caused by UE synchronization error $\Delta\tau_{UE}$. This method is gNB/eNB assisted and does not use additional information except the gNB/eNB measured channel estimation information (channel estimate).

Assuming that the distance between the UE and RU is proportional to delay $T_{delay}$, the O-RUs are perfectly synchronized, and the UE has synchronization error of $\Delta\tau_{UE}$, then:

$$\tau_{receive\,RU_i} = \tau_{delay\,i} + \Delta\tau_{UE} \quad \text{(EQ. 1)}$$

Thus, the received timing has UE related error. The TDOA measurement can reduce or eliminate the UE related error:

$$\tau_{TDOA\,RU_{i,j}} = \tau_{delay\,i} - \tau_{delay\,j} \quad \text{(EQ. 2)}$$

O-RU Synchronization and Synchronization Error:

Multi-RU clusters working with gNB/eNB, based on ORAN architectural split 7.2 and using the ORAN defined synchronization plane (S-Plane) for synchronization, can be used for UE positioning estimation. The precise estimation of UE positioning requires the O-RU synchronization with high accuracy. According to the ORAN specifications, O-RUs in a cluster that use the synchronization procedure can have time error <=65 nsec (which can be considered a "raw" synchronization error):

$$\tau_{receive\,RU_i} = \tau_{delay\,i} + \Delta\tau_{UE} + \Delta\tau_{RU_i} \quad \text{(EQ. 3)}$$

$$\tau_{TDOA\,RU_{i,j}} = \tau_{delay\,i} - \tau_{delay\,j} + \Delta\tau_{RU_i} - \Delta\tau_{RU_j} \quad \text{(EQ. 4)}$$

Procedures according to the present disclosure can estimate the remaining error $\Delta\tau_{RU_i}$ with high estimation accuracy of, e.g., 1 nsec, and give an ability to estimate the location of the UE with sub-meter accuracy (with the ORAN defined synchronization error, that timing accuracy is impossible).

ORAN Cluster Architecture:

The gNB architectural structure based on fronthaul interface described by ORAN specifications can include several Radio Units (O-RU) that cover the area of service of the specific gNB/eNB (containing O-DU and O-CU units). See O-RAN.WG4.CUS.0-v06.00, the entire content of which is incorporated herein by reference. An example of a gNBs/eNBs cluster supporting positioning calculations is shown in FIG. 1.

FIG. 1 is a diagram of an example of a positioning framework 100 including a cluster of base station (gNBs/eNBs) radio units (O-DUs and O-RUs), in accordance with the present disclosure. Multiple UEs 110(1)-(N) are shown at respective locations. The framework 100 can include multiple O-DUs 120(1)-(M). Each O-DU can be connected to one or more O-RUs by, e.g., as shown by O-RU plurality 130(1)-(K) connected to O-DU 120(1) and O-RU plurality 130(1)-(L) connected to O-DU 120(M). The synchronization error $\Delta\tau_{UE}$ is shown for each UE. Also shown is the synchronization error $\Delta\tau_{RU_i}$ for each O-RU to the respective O-DU.

In operation, each $UE_u$ transmits a unique sequence $SRS_u$, which is received in the O-RUs—or a subset of the O-RUs, e.g., the O-RUs that receive the $SRS_u$ signal with SNR level sufficient to allow the channel estimate procedure to estimate Timing Offset, Power Delay Profile and SNR with sufficient level of estimation accuracy, usually SNR>3 dB.

The interface between the O-DUs and O-RUs, indicated in FIG. 1 as fronthaul Split 7.2, can be ethernet based using eCPRI or IEEE 1914.3 encapsulation, in exemplary embodiments. In the 7.2 Split (a.k.a., 7:2 Split), the RF and LPHY (lower PHY) of the radio protocol stack remain in the Radio Unit and UPHY (Upper PHY) to URLC (Upper Radio Link Control) are processed within the O-DU (Distributed Unit).

Synchronization is of high importance in 5G networks, particularly in the fronthaul design. The O-RAN alliance has defined four types of synchronization plane (S-Plane) configuration modes for timing distribution in the RAN infrastructure. The S-Plane configuration modes are specified in O-RAN Control, User and Synchronization Plane Specification (O-RAN.WG4.CUS.0-v05.00, the entire content of which is incorporated herein by reference) and address synchronization plane configuration between O-RU and O-DU. These configuration modes are the following:

- Configuration LLS-C1 (LLS-C1): This configuration specifies network timing distribution from a 0-DU to a O-RU by way of point-to-point (P2P) topology between a central site and a remote site;
- Configuration LLS-C2 (LLS-C2): In this configuration, one or more ethernet switches can be present for network timing distribution from O-DU to O-RU between central sites and remote sites. The interconnection among switches and fabric topology (for example mesh, ring, tree, spur etc.) are out of scope of this configuration and subject to deployment decisions;
- Configuration LLS-C3 (LLS-C3): In this configuration, network timing distribution is done from Primary Reference Time Clock (PRTC)/Telecom-Grandmaster (T-GM) to O-RU between central sites and remote sites. One or more Ethernet switches can be present in the fronthaul network. Interconnection among switches and fabric topology (for example mesh, ring, tree, spur etc.) are deployment decisions which are out of the scope of the O-RAN specification; and
- Configuration LLS-C4: (LLS-C4): In this configuration local PRTC (Primary Reference Time Clock) provides timing input to the O-RU(s).

Figure 2:
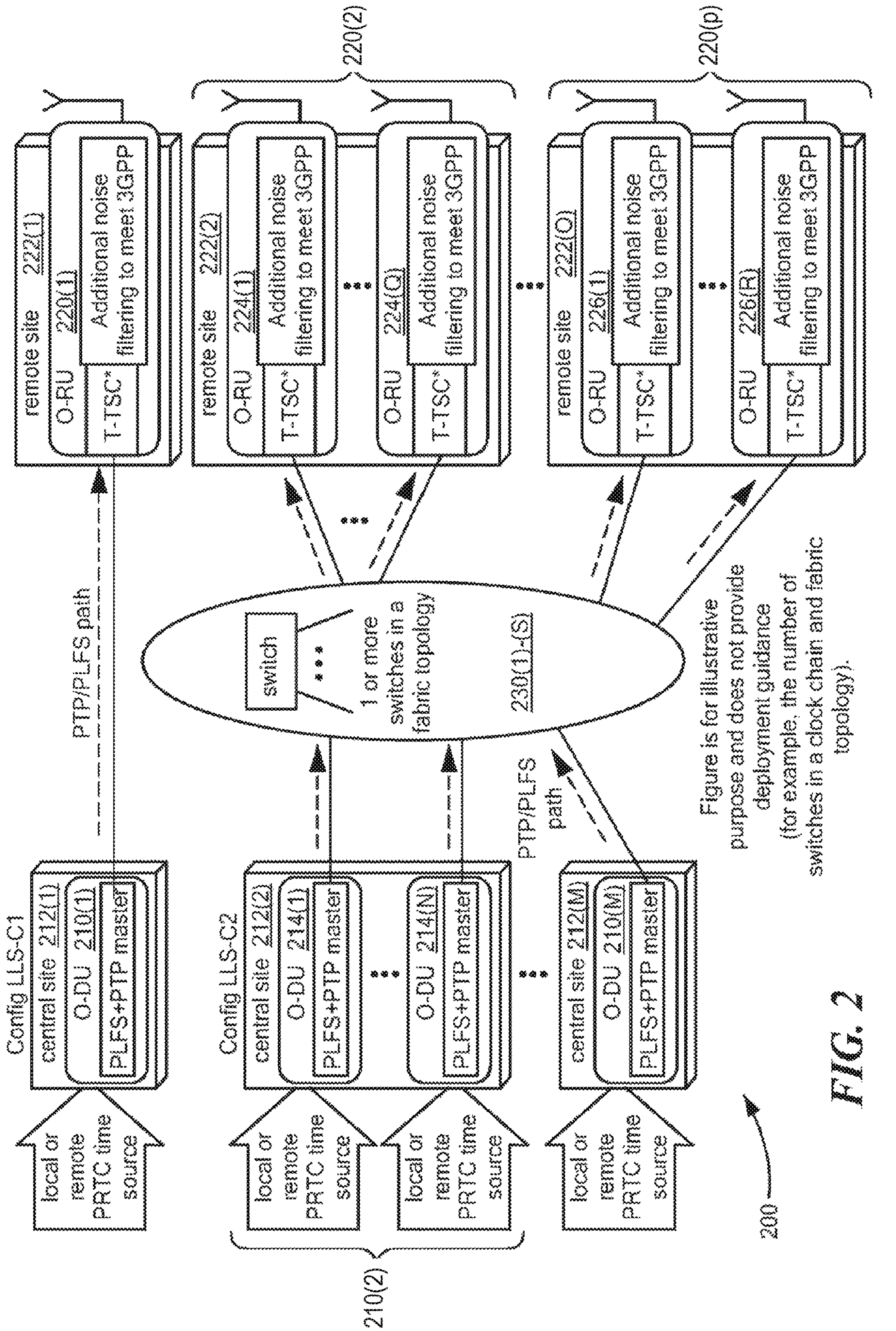
FIG. 2 shows an example synchronization structure for O-RUs and O-DUs, in accordance with the present disclosure.

FIG. 2 shows an example synchronization structure 200 for O-RUs and O-DUs, in accordance with the present disclosure. A number (plurality) of O-DUs 210(1)-(M) are shown located at a plurality of central sites 212(1)-(M). A number (plurality) of O-RUs 220(1)-(N) are shown located at a number (plurality) of remote sites 222(1)-(N). A central site may have more than one O-DU, e.g., as shown by central site 212(2) with O-DU 210(2) including a plurality of O-DUs 214(1)-(N). A remote site may have more than one O-RU, e.g., as shown by remote site 222(2) with O-RU 220(2) including a plurality of O-RUs 224(1)-(Q). Remote site 222(O) is shown with O-RU 220(P) including a plurality of O-RUs 226(1)-(R); the plurality may differ in number than plurality 224(1)-(Q) at remote site 222(2).

The central sites 212(1)-(M) and remote sites 222(1)-(O) may be configured with an S-Plane configuration mode defined by the O-RAN specification. For example, central site 212(1) is shown as having S-Plane configuration mode LLS-C1 with a direct connection (with indicated PTP/PFLS path) to remote site 222(1). Central cites 212(2) and 212(M) are shown as having S-Plane configuration mode LLS-C2 with an indirect connection, via one or more switches 230(1)-(S), to remote sites 222(2) and 222(O), respectively. In some embodiments, other S-plane modes (LLS-C3 and/or LLS-C4) can be used within the scope of the present disclosure.

As shown in FIG. 2, in exemplary embodiments, synchronization between the O-RU units can be performed/accomplished by an O-DU, e.g., 210(M), acting as a master to distribute timing towards the one or more connected O-RUs, e.g., 226(1)-(R). One or more network switches 230(1)-(S) can be located in the network link between the O-DU and O-RU. The synchronization errors between O-RU units can be up to 65 nsec according to requirements stated in O-RAN.WG4.CUS.0-v06.00.

Figure 3:
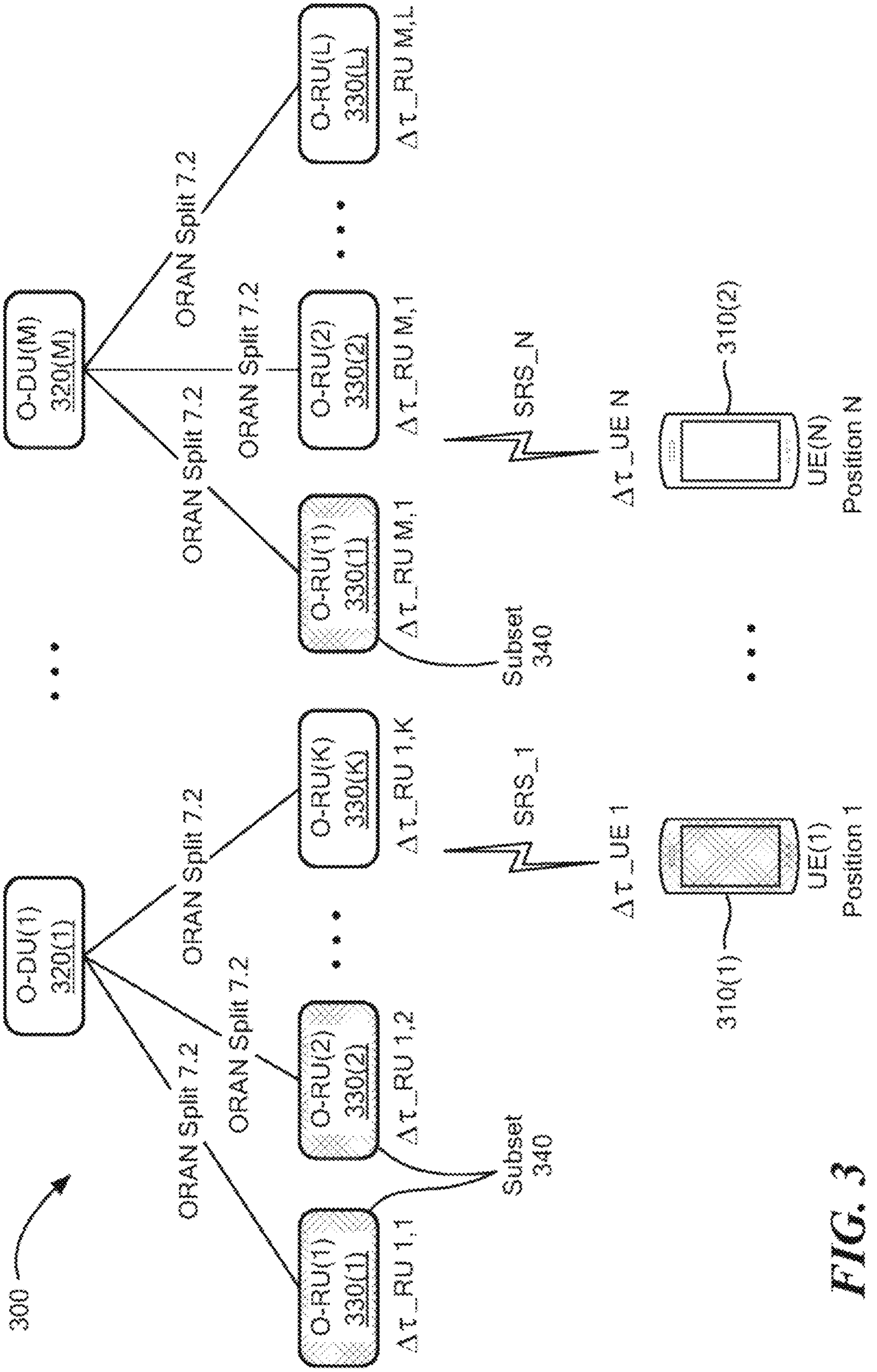
FIG. 3 is a diagram of an example of a positioning framework including a plurality of base station (gNBs/eNBs) radio units (O-DUs and O-RUs), similar to as shown in FIG. 1, but with a subset of O-RUs selected for position estimation, in accordance with the present disclosure.

Position Estimation Framework—Subset of RUs Selection for UE, Position Estimation:

To keep the complexity of UE position estimation algorithms in predefined or more managable range (e.g., computationally), a subset can be selected of the O-RUs receiving the $SRS_u$ signal sent from $UE_u$. In some embodiments, the selection criterion/criteria can include the maximum received SNR value in each O-RU as shown in FIG. 3. Of course, in other embodiments, a selection of a O-RU subset can be based on other or additional criteria/criterion. In other embodiments, all the O-RUs receiving the SRSu signal can be selected for position estimation (e.g., computational resources permitting).

FIG. 3 is a diagram of an example of a positioning framework 300 including a cluster of base stations (gNBs/eNBs) radio units (O-DUs and O-RUs), similar to as shown in FIG. 1, but with a subset of O-RUs selected for position estimation, in accordance with the present disclosure.

The framework 300 can include multiple O-DUs 320(1)-(M). Each O-DU can be connected to one or more O-RUs by, e.g., as shown by O-RU plurality 330(1)-(K) connected to O-DU 320(1) and O-RU plurality 330(1)-(L) connected to O-DU 320(M). The synchronization error $\Delta\tau_{UE}$ is shown for each UE. Also shown is the synchronization error $\Delta\tau_{RU_i}$ for each O-RU to the respective O-DU. An example of a selected subset 340 of three O-RUs is shown, i.e., O-RU 330(1) and O-RU 330(2) connected to O-DU 320(1) and also O-RU 330(1) connected to O-DU 320(M). Subset 340 can be used for position estimation, as described in further detail below.

After selection of the subset 340 of O-RUs associated with a specific $UE_u$, the position of the $UE_u$ can be estimated by applying a nonlinear iterative algorithm that uses UL-TDOA measurements for the selected subset 340 of antennas (O-RUs). Each UE for which one can estimate the position will have its own subset of O-RUs with best reception quality and can have its own position estimation tracker algorithm entity or instance that uses the UL-TDOA measurements of this UE, for example as shown in FIG. 4.

Figure 4:
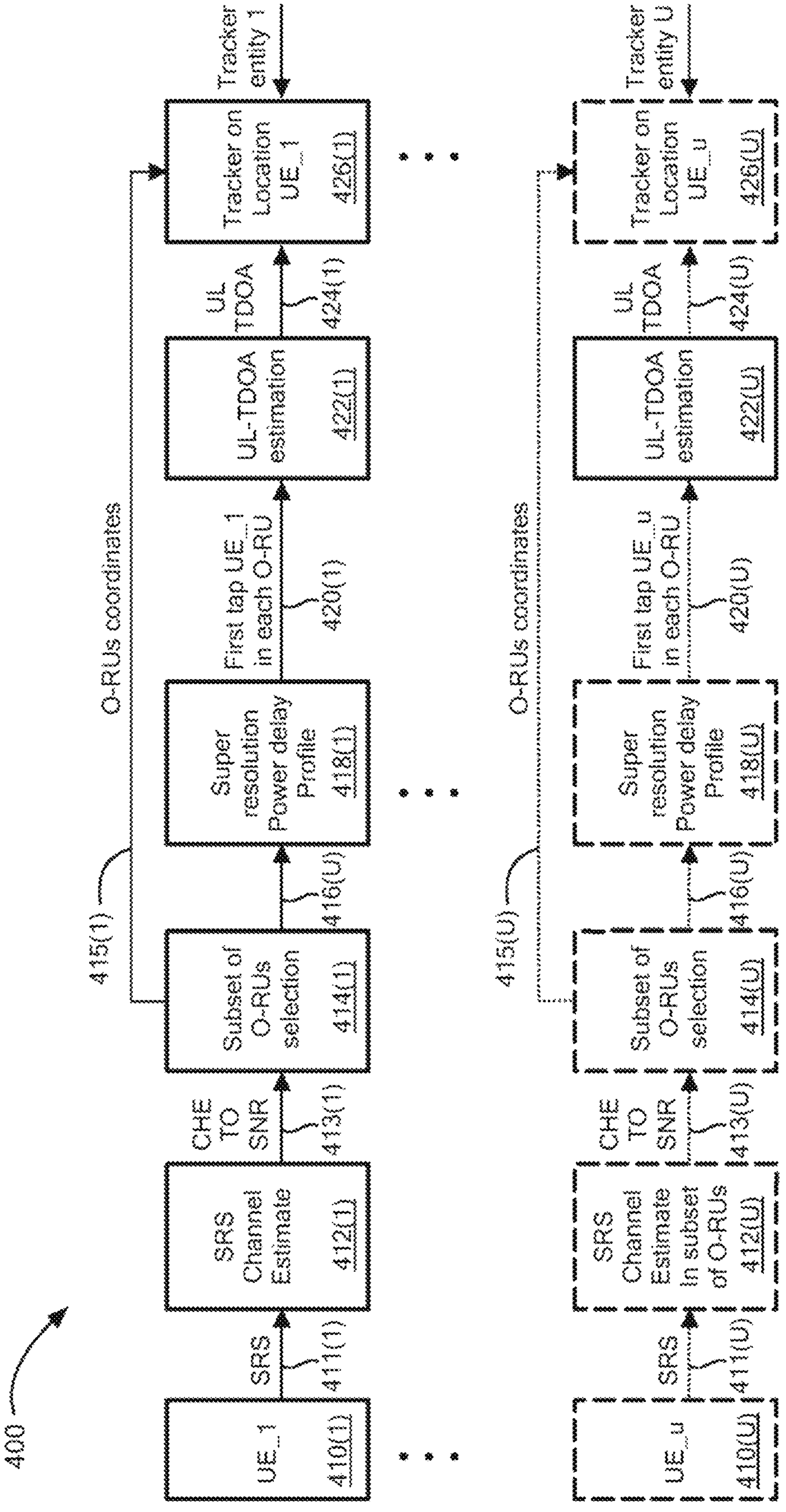
FIG. 4 is a diagram of an example of a UL-TDOA UE position estimation process/algorithm flow, in accordance with the present disclosure.

FIG. 4 shows an example of a UL-TDOA UE position estimation process/algorithm flow 400, in accordance with the present disclosure. The position estimation process/algorithm 400 can be used to estimate position of one or more UEs, shown by representative UEs 410(1)-(U) in the service area of an eNB/gNB with an O-DU and one or more O-RUs (not shown). For each UE 410(1)-(U), SRS channel estimation block 412(1)-(U) is configured to receive SRS 411(1)-(U) from the UE and to produce a corresponding channel estimate CHE 413(1)-(U), e.g., with SNR. A subset selection block 414(1)-(U) can select a subset of the O-RUs in the service area, e.g., ones that have a channel estimate with a SNR above a given threshold, e.g., 3 dB. Block 414(1)-(U) can provide the channel estimates from the O-RU subset that is selected, as an output 416, to a super resolution power delay block 418(1)-(U).

The minimum delay, which is proportional to the LOS element (which can be closely estimated by the first tap, as described below) of the multipath profile of the channel estimate, can be evaluated by application of a super-resolution PDP estimation algorithm (at super resolution power delay profile (PDP) block 418(1)-(U)) on a channel estimate in each O-RU in the selected O-RU subset. In exemplary embodiments, the Multiple-Signal Classification ("MUSIC") algorithm, or the Matrix Pencil algorithm in case of multiple-antenna O-RU, can be used as suitable algorithms for this purpose. For an example of the MUSIC algorithm, see Hayes, Monson H., "Statistical Digital Signal Processing and Modeling", John Wiley & Sons, Inc., 1996; and for an example of the Matrix Pencil algorithm, see Hua, Yingbo, "Estimating two-dimensional frequencies by matrix enhancement and matrix pencil," IEEE Transactions on Signal Processing 40.9 (1992), the entire contents of both of which are incorporated herein by reference.

Super resolution PDP block 418(1)-(U) can provide the minimum delay, shown as first tap UE to each O-RU output 420(1)-(U), to a UL-TDOA block 422(1)-(U). UL-TDOA block 422(1)-(U) can provide a UL-TDOA measurement to a tracker on location for the UE, as shown by location tracker entity 426(1)-(U). Block 416(1)-(U) can also provide the coordinates (indicated by 415(1)-(U)) of the O-RUs in the selected O-RU subset to the location tracker entity 426(1)-(U), as shown.

As used in exemplary embodiment, the MUSIC algorithm can use the noise space of covariance matrix of the channel estimate, provided by Eq. (5), in order to estimate the PDP of the channel with high accuracy. An example of using the MUSIC algorithm to evaluate/determine the minimum delay for a given UE is described below with regard to Steps 1-2.

Step 1. Covariance can be calculated according to EQ. 5:

$$\widehat{R_{che}} = \frac{1}{N} CHE_i \cdot CHE_i^H \quad \text{(EQ. 5)}$$

Here (above) $CHE_i$ is complex channel estimate of the SRS, transmitted from $UE_u$ and received in $O\text{-}RU_i$.

Step 2. Delay spectrum:

Perform eigenvalue decomposition of the $\widehat{R_{che}}$ and use noise subspace for PDP estimation:

$$\widehat{P_{MU}} = \frac{1}{\sum_{i=p+1}^{N} |e^H v_i|^2} \quad \text{(EQ. 6)}$$

Where $v_i$ is the noise subspace and e is defined by Eq. (7):

$$e = [1 \;\; e^{-1\cdot 2\pi i\delta\tau} \;\; e^{-2\cdot 2\pi i\delta\tau} \;\; e^{-3\cdot 2\pi i\delta\tau} \;\; \ldots \;\; e^{-(N-1)\cdot 2\pi i\delta\tau}] \quad \text{(EQ. 7)}$$

Here $\delta\tau$ is the timestep of the spectrum and N is the channel estimate length. The peaks in $\widehat{P_{MU}}$ represent PDP taps of multipath channel and timing delay is $k\cdot\delta\tau$ if the tap is in index k. The first tap can be considered as the closest estimation of LOS delay (in the absence of destructive interference, e.g., deep fading), thus, calculating the shortest delay.

After estimation of the shortest delay between the $UE_u$ and each O-RU in the subset of O-RUs, the UL-TDOA can be estimated (at UL-TDOA estimation block 422(1)-(U)), e.g., as described in Eq. (2). Examples of algorithms which can estimate the position of $UE_u$ based on UL-TDOA measurements are described in C. Mensing and S. Plass, "Positioning Algorithms for Cellular Networks Using TDOA," 2006, IEEE International Conference on Acoustics Speech and Signal Processing Proceedings, Toulouse, France, 2006, pp. IV-513 to IV-516, doi: 10.1109/ICASSP.2006.1661018, the entire content of which is incorporated herein by reference.

The distance between the $UE_u$ and O-RUs in a selected O-RU subset can be written as:

$$r_v(x) = \sqrt{(x_v - x)^2 + (y_v - y)^2} \quad \text{(EQ. 8)}$$

Where x=[x, y], the coordinates of the $UE_u$ and x, =[$x_v$, $y_v$] are coordinates of the O-RUs in subset. The UL TDOA measurement multiplied by speed of light c is equal to $r_v(x)$:

$$d(x) = (\tau_{TDOA\ O\text{-}RU_{i,j}}) \cdot c = (\tau_{delay\,i} - \tau_{delay\,j}) \cdot c = r_i(x) - r_j(x) \quad \text{(EQ. 9)}$$

The continuous tracking of the estimated position of $UE_u$x=[x,y] can be performed by a suitable tracking filter, e.g., such as a variant of the Kalman filter or an equivalent.

Exemplary embodiments of the present disclosure can utilize the Unscented Kalman Filter (UKF). For example, the UKF can be used, where the nonlinear transformation is defined by Eq. (8) and the initialization of the process can be done by application of Levenberg-Marquardt algorithm, e.g., as described in C. Mensing and S. Plass, "Positioning Algorithms for Cellular Networks Using TDOA," 2006 (noted previously). IEEE International Conference on Acoustics Speech and Signal Processing Proceedings, Toulouse, France, 2006, pp. IV-IV, doi: 10.1109/ICASSP.2006.1661018, the entire content of which is incorporated herein by reference. In alternate embodiments, other algorithms, methods, and structures may be used for initialization, e.g., deep neural networks or other neural networks that provide for deep learning or equivalent functionality.

UKF for Location Estimation General Structure:

As noted above, in exemplary embodiments, the Unscented Kalman Filter (UKF) can be used for UE position estimation and/or tracking. The Unscented Kalman Filter (UKF) can perform nonlinear state estimation, e.g., as described in, e.g., Simon Haykin, "Kalman Filtering and Neural Networks," John Wiley & Sons, Ltd, 2001, the entire content of which is incorporated herein by reference.

In case of UE position estimation and tracking, UKF estimation can be used for coordinate (position) estimation given the following inputs to the UKF: (1) measurements between the UE for which location is estimated and the O-RUs in the subset; (2) the coordinates of the O-RUs in the subset; (3) and the estimated state for each UE, e.g., including UE coordinates, speed and acceleration for each axis. The estimation can be performed for each UE separately and should be reinitialized if the serving O-RUs subset is changed or the UE is disconnected. The third input to Unscented Kalman Filter is the estimated coordinates of the UE or constant coordinates of the reference UE in a predefined position, where the UE is the UE for which the UL-TDOA measurements are provided.

The UKF operation/implementation can include the following stages:

1. State Vector and State Vector Initialization.

State vector of the position tracker includes the following fields:

$$x_k = [x, y, v_x, v_y, a_x, a_y]^T \tag{EQ. 10}$$

The initialization of the assimilated state vector can be performed by application of the Levenberg Marquardt iterative algorithms with measured TDOA and related RU positions, as indicated in Eq. (11):

$$x_0^a = [x_0, y_0, 0, 0, 0, 0]^T \tag{EQ. 11}$$

2. Calculation of Sigma Points.

Sigma points can be calculated from the previous assimilated state vector and Cholesky decomposed state covariance matrix $P_k$:

$$L_{k-1}L_{k-1}^T = chol(P_{k-1}) \tag{EQ. 12}$$

$$x_{k-1}^0 = x_{k-1}^a \tag{EQ. 13}$$

-continued $$x_{k-1}^i = x_{k-1}^a + \left(\sqrt{\frac{n}{1-W^0}}\right)L_{k-1}^{column\,i},\ i = 1 \ldots n$$

$$x_{k-1}^{i+n} = x_{k-1}^a - \left(\sqrt{\frac{n}{1-W^0}}\right)L_{k-1}^{column\,i},\ i = 1 \ldots n$$

where $W^0$ is a scaling parameter, and n is the size of the state.

3. Forecast Stage.

In forecast stage, the movement transformation M is used propagation of sigma points in time according to state information.

$$M = \begin{bmatrix} 1 & 0 & \Delta t & 0 & \frac{\Delta t^2}{2} & 0 \\ 0 & 1 & 0 & \Delta t & 0 & \frac{\Delta t^2}{2} \\ 0 & 0 & 1 & 0 & \Delta t & 0 \\ 0 & 0 & 0 & 1 & 0 & \Delta t \\ 0 & 0 & 0 & 0 & 1 & 0 \\ 0 & 0 & 0 & 0 & 0 & 1 \end{bmatrix} \tag{EQ. 14}$$

Each sigma point can be propagated by application of Eq. 15:

$$x_k^{f,j} = M \cdot x_{k-1}^j,\ j = 1 \ldots 2n \tag{EQ. 15}$$

and averaged for statistics estimation:

$$x_k^f = \sum_{j=0}^{2n} W^j \cdot x_{k-1}^j,\ W^j = \frac{1-W^0}{2n} \tag{EQ. 16}$$

and where the state covariance matrix can be calculated according to Eq. 17:

$$P_k^f = \sum_{j=0}^{2n} W^j \cdot (x_k^{f,j} - x_k^f)(x_k^{f,j} - x_k^f)^T + Q_{k-1} \tag{EQ. 17}$$

where $Q_{k-1}$ is process noise covariance.

4. Observation Stage.

The dimension of the observation prediction vector depends on the number of O-RUs used in estimation process and equal to number of combinations of O-RU pairs $$C = \binom{N_{ant}}{2}.$$

The predicted observation, as described in Eq. (18), is the distance difference calculated for all sigma points $$x_k^{f,j}$$

vs O-RU coordinates as described in Eq. (9):

$$y_{k-1}^{f,j} = r_{C(2)}^{f,j} - r_{C(1)}^{f,j} \tag{EQ. 18}$$

after distance difference calculation, the prediction statistics can be calculation according to Eq. (19), Eq. (20) and Eq. (21):

$$y^{f}_{k-1} = \sum_{j=0}^{2n} W^{j} \cdot y^{f,j}_{k-1},\ W^{j} = \frac{1-W^{0}}{2n} \quad \text{(EQ. 19)}$$

The covariance matrix of observation can be calculated according to Eq. (20):

$$R_{yy} = \sum_{j=0}^{2n} W^{j} \cdot \left(y^{f,j}_{k-1} - y^{f}_{k-1}\right)\left(y^{f,j}_{k-1} - y^{f}_{k-1}\right)^{T} + R_{k-1},\quad W^{j} = \frac{1-W^{o}}{2n} \quad \text{(EQ. 20)}$$

where $R_{k-1}$ is measurement noise covariance matrix. Eq. (21) describes the state prediction and observation cross covariance matrix:

$$R_{xy} = \sum_{j=0}^{2n} W^{j} \cdot \left(x^{f,j}_{k} - x^{f}_{k}\right)\left(y^{f,j}_{k-1} - y^{f}_{k-1}\right)^{T},\ W^{j} = \frac{1-W^{o}}{2n} \quad \text{(EQ. 21)}$$

5. Data Assimilation Stage.

In this stage, the TDOA measurement in the form calculated in Eq. (9) is used in Eq. (23); it can be defined as $\gamma_k \equiv d(x)$.

$$K_k = R_{xy} \cdot R_{yy}^{-1} \quad \text{(EQ. 22)}$$

$$x^{a}_{k} = x^{f}_{k} + K_k \cdot \left(y_k - y^{f}_{k-1}\right) \quad \text{(EQ. 23)}$$

$$P_k = P^{f}_{k} - K_k \cdot R_{yy} \cdot K_k^{T} \quad \text{(EQ. 24)}$$

The error of the estimation of $UE_u$ position x=[x, y] is highly dependent on the synchronization error between the O-RUs in the estimating subset since the UL-TDOA is estimated by Eq. (4) which has the error $\Delta\tau_{RU_i}$-$\Delta\tau_{RU_j}$.

Figure 5:
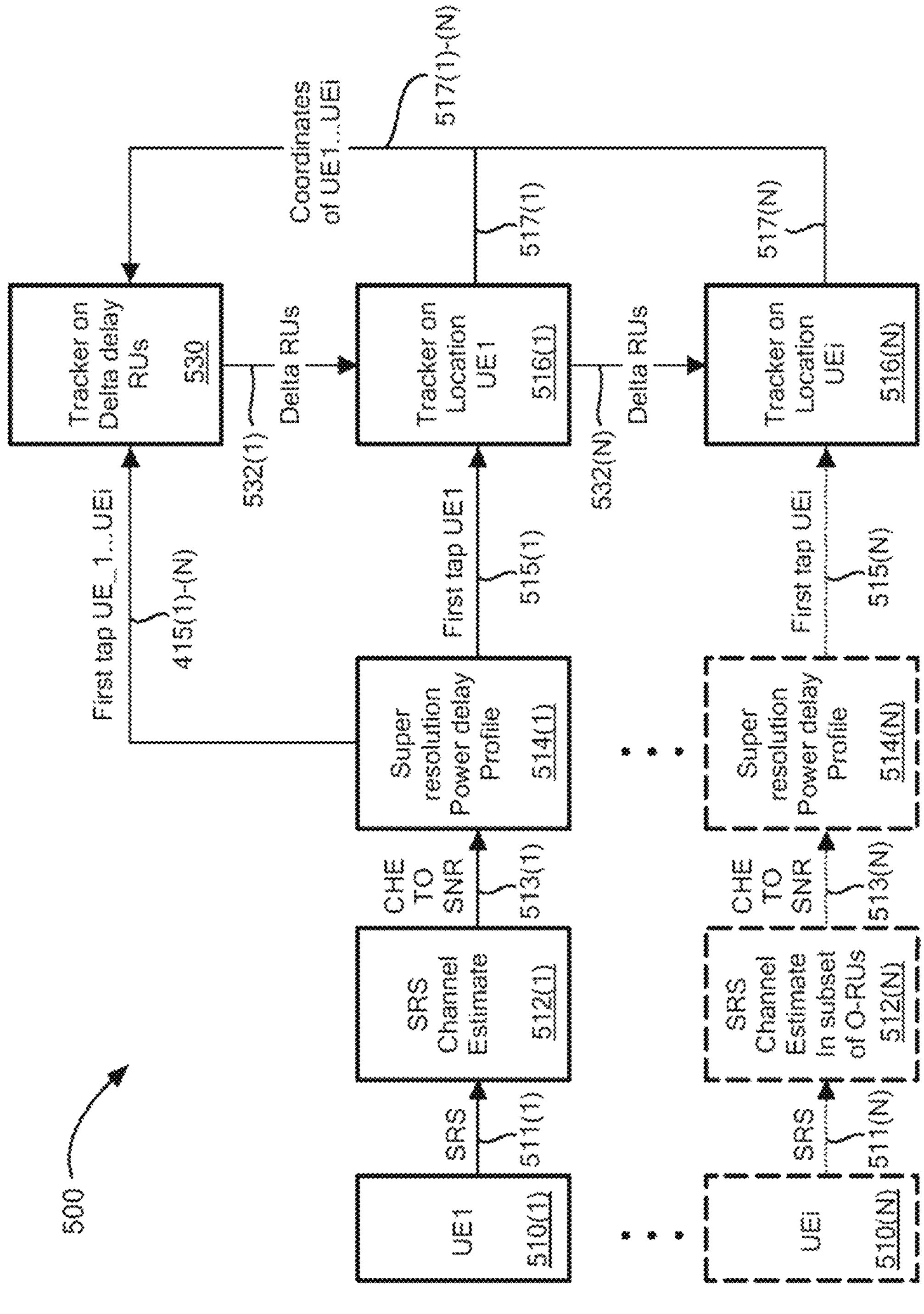
FIG. 5 is a diagram showing an example of an algorithm structure and processing flow for position and synchronization error estimation, in accordance with the present disclosure.

RU Synchronization Error Estimation:

FIG. 5 is a diagram showing an example of an algorithm structure and processing flow 500 for position and synchronization error estimation, in accordance with the present disclosure. Algorithm structure 500, which can be considered as a position estimation framework, can use the UL-TDOA measurements to estimate remaining synchronization error between the O-RUs in a serving cluster (e.g., O-RU subset 340 shown in FIG. 3) providing service to multiple UEs 510(1)-(N).

Structure/framework 500 can include several processing blocks:

(1) A SRS receiver block 512(1)-(N) configured to receive SRS 511(1)-(N) from the UEs 510(1)-(N) for SRS based channel estimation, shown by channel estimates CHE 513(1)-(N);

(2) Super resolution algorithm 514(1)-(N) calculates the shortest delay in multipath environment to each RU in the subset/cluster (e.g., O-RU subset 340 shown in FIG. 3), shown as first tap UE (representing LOS) 515(1)-(N);

(3) Nonlinear tracking algorithm, shown as Tracker on Location blocks (or tracker entities) 516(1)-(N), for position estimation calculates the estimated position of UE based on received UL-TDOA of shortest delays to O-RUs in cluster as described above; and (4) Nonlinear tracking algorithm, shown as Tracker on Delay delta RUs, 530 for O-RU synchronization error estimation—which uses estimated positions of UEs (provided by blocks 516(1)-(N)) and UL-TDOA based on shortest delays (515(1)-(N)) to estimate the RU synchronization error 532(1)-(N) with high accuracy.

In FIG. 5, the processing provided by structure 500 can, in exemplary embodiments, be divided into two types: processing that should take place in a O-DU, and processing that can be performed in a O-CU or even in higher layers. For example, in exemplary embodiments, O-DU processing can include (i) SRS Channel estimate (block 512), and (ii) super resolution power delay profile estimation (block 514), and O-CU processing can include (i) tracker on UE location (block 516), and (ii) Tracker on Delta RU synchronization errors (block 530).

In exemplary embodiments, the nonlinear tracking algorithm 530 for O-RU synchronization error estimation can include a UKF estimator. In exemplary embodiments, the UKF estimator of O-RU synchronization error (employed in 530) can use the following inputs:

(i) TDOA measurements between the UE (for which the location is estimated) and O-RUs in the subset;

(ii) Estimated coordinates of the UEs served by O-RUs in the subset; and (iii) The coordinates of the O-RUs in the subset.

The idea of using UKF for O-RU synchronization error estimation is based on the fact that the synchronization error of O-RU (translated to distance error between a UE and the O-RUs in the subset of O-RUs) is in orthogonal space with respect to actual distance of the UE to the O-RUs.

The state of the UKF can be defined as described in Eq. (25) (e.g., for a case of a subset of three O-RUs):

$$x_k = \left[\Delta\tau_{RU_1}\ \ \Delta\tau_{RU_2}\ \ \Delta\tau_{RU_3}\ \ v_{\Delta\tau_{RU_1}}\ \ v_{\Delta\tau_{RU_2}}\ \ v_{\Delta\tau_{RU_3}}\right]^{T} \quad \text{(EQ. 25)}$$

where $\Delta\tau_{RU_i}$ is synchronization error of $RU_i$ and $v_{\Delta\tau_{RUi}}$ the speed of change of this synchronization error.

The sigma points of this state can be calculated and then used in Eq. (26) to evaluate/determine an observation estimation point:

$$y^{f,j}_{k-1} = r(\Delta\tau)^{f,j}_{C(2)} - r(\Delta\tau)^{f,j}_{C(1)} \quad \text{(EQ. 26)}$$

where $$r(\Delta\tau)^{f,j}_{c(i)}$$

is distance between the UE and O-RU which includes distance errors caused by synchronization error, and is calculated for each sigma point f,j of O-RU C(i) for $\Delta\tau_{RU_i}$ in state according to Eq. (27):

$$r(\Delta\tau)^{f,j}_{C(i)} = \left\|ORU_i(x, y),\ U\overline{E(x, y)}\right\| + \Delta\tau^{f,j}_{RU_i} \cdot c \quad \text{(EQ. 27)}$$

where $ORU_i(x,y)$ represents the the O-RU(i) coordinates, $U\widehat{E(x,}\, y)$ represents the estimated UE coordinates, $$\Delta\tau_{RU_i}^{f,j}$$

represents the sigma point related to synchronization error of $O\text{-}RU_i$ state entry, and c is the speed of light.

In the forecast stage, the movement transformation M can be used to calculate sigma points propagation in time according to state information, as in Eq. (28):

$$M = \begin{bmatrix} 1 & 0 & \Delta t & 0 \\ 0 & 1 & 0 & \Delta t \\ 0 & 0 & 1 & 0 \\ 0 & 0 & 0 & 1 \end{bmatrix} \quad \text{(EQ. 28)}$$

Each sigma point can be propagated by application of Eq. (29):

$$x_k^{f,j} = M \cdot x_{k-1}^j,\ j = 1 \cdots 2n \quad \text{(EQ. 29)}$$

The observation stage can be defined as follows. The dimension of the observation prediction vector depends on number of O-RUs used in estimation process and equal to number of combinations of O-RU pairs $$C = \binom{N_{ant}}{2}.$$

The predicted observation, as described in Eq. (30), is the distance difference calculated for all sigma points $$x_k^{f,j}$$

vs O-RU coordinates as described in Eq. (9):

$$y_{k-1}^{f,j} = r(\Delta\tau)_{C(2)}^{f,j} - r(\Delta\tau)_{C(1)}^{f,j} \quad \text{(EQ. 30)}$$

After distance difference calculation, the prediction statistics can be calculated according to Eq. (31), Eq. (32), and Eq. (33):

$$y_{k-1}^f = \sum_{j=0}^{2n} W^j \cdot y_{k-1}^{f,j},\ W^j = \frac{1 - W^o}{2n} \quad \text{(EQ. 31)}$$

The covariance matrix of observation can be calculated according to Eq. (32):

$$R_{yy} = \sum_{j=0}^{2n} W^j \cdot \left(y_{k-1}^{f,j} - y_{k-1}^f\right)\left(y_{k-1}^{f,j} - y_{k-1}^f\right)^T + R_{k-1},\quad W^j = \frac{1 - W^o}{2n} \quad \text{(EQ. 32)}$$

where $R_{k-1}$ is the measurement noise covariance matrix.

Eq. (32) describes the state prediction and observation cross covariance matrix:

$$R_{xy} = \sum_{j=0}^{2n} W^j \cdot \left(x_k^{f,j} - x_k^f\right)\left(y_{k-1}^{f,j} - y_{k-1}^f\right)^T,\ W^j = \frac{1 - W^o}{2n} \quad \text{(EQ. 33)}$$

In the data assimilation stage, the TDOA measurement, in the form calculated in Eq. (9), can be defined as $y_k \equiv d(x)$ and used in Eq. (35). Eq. (34) describes the gain coefficient. Eq. (36) describes the posterior covariance matrix.

$$K_k = R_{xy} \cdot R_{yy}^{-1} \quad \text{(EQ. 34)}$$

$$x_k^a = x_k^f + K_k \cdot \left(y_k - y_{k-1}^f\right) \quad \text{(EQ. 35)}$$

$$P_k = P_k^f - K_k \cdot R_{yy} \cdot K_k^T \quad \text{(EQ. 36)}$$

After converging, this procedure estimates $\Delta\tau_{RU_i}$ with high accuracy of, e.g., 1 nsec. In some embodiments, the error $\Delta\tau_{RU_i}$ can be tracked or estimated over a range from, e.g., about 1 nsec to about 100 ns, or about 1 ns up to about 2500 ns is some other embodiments The positioning estimation of the UEs can be improved correspondingly. See Eq. (4).

Figure 6:
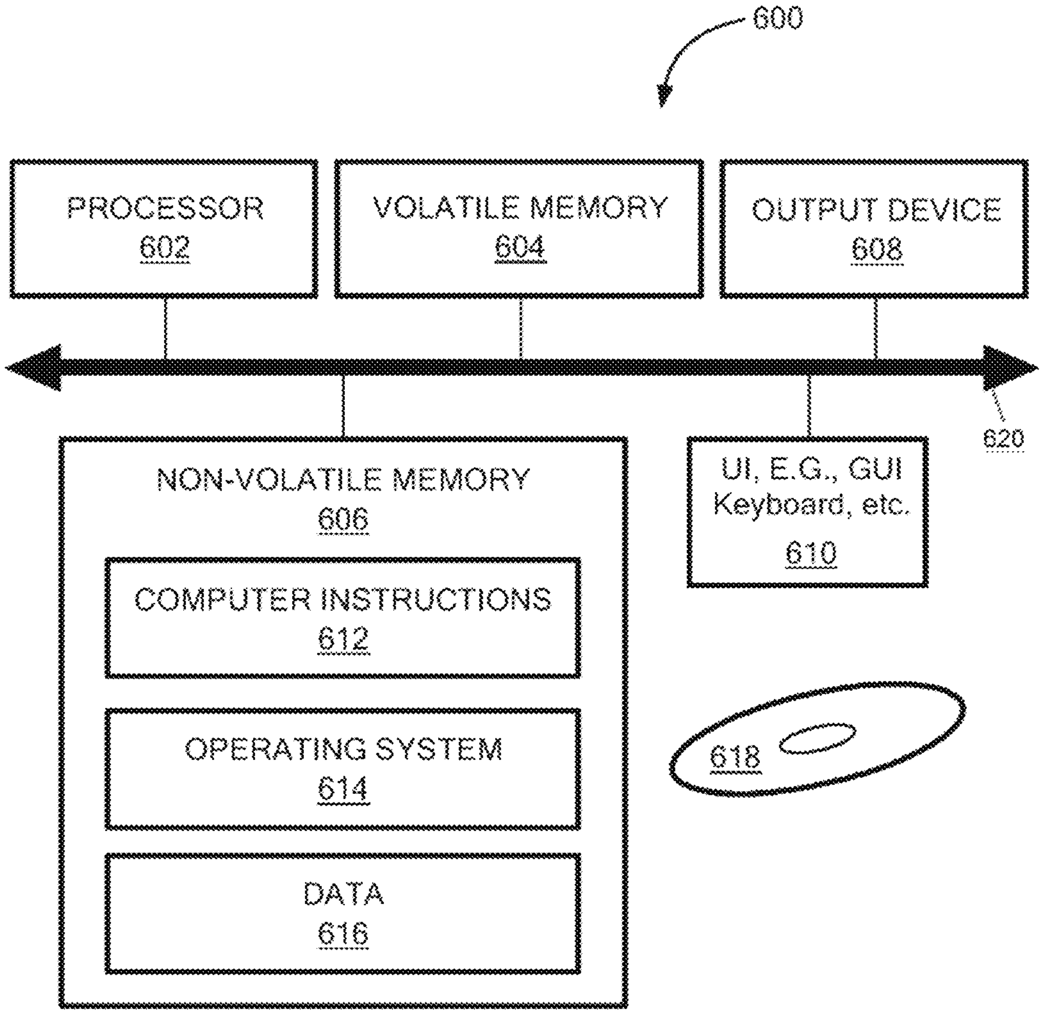
FIG. 6 is a schematic diagram of an example computer system that can perform all or at least a portion of methods, algorithms, and processing, in accordance with the present disclosure.

FIG. 6 is a schematic diagram of an example computer system 600 that can perform all or at least a portion of the processing, e.g., steps in the algorithms and methods described herein and/or solving of equations any of the equations (e.g., EQS. 1-36) described herein. The computer system 600 includes one or more processors, e.g., as indicated by processor 602, a volatile memory 604, a non-volatile memory 606 (e.g., hard disk), an output device 608 and a user input or interface (UI) 610, e.g., graphical user interface (GUI), a mouse, a keyboard, a display, or any common user interface, etc. The non-volatile memory (non-transitory storage medium) 606 stores computer instructions 612 (a.k.a., machine-readable instructions, computer-readable instructions, and/or code) such software (computer program product or software application(s)), an operating system 614 and data 616. In one example, the computer instructions 612 are executed by the processor 602 out of (from) volatile memory 604. In one embodiment, an article 618 (e.g., a storage device or medium such as a hard disk, an optical disc, magnetic storage tape, optical storage tape, flash drive, etc.) includes or stores the non-transitory computer-readable instructions. Bus 620 is also shown.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), and optionally at least one input device, and one or more output devices. Program code may be applied to data entered using an input device or input connection (e.g., port or bus) to perform processing and to generate output information.

The system 600 can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. Further, the terms "computer" or "computer system" may include reference to plural like terms, unless expressly stated otherwise.

Processing may be performed by one or more programmable processors executing one or more computer programs to perform the functions of the system. All or part of the system may be implemented as, special purpose logic circuitry, e.g., an FPGA (field programmable gate array) and/or an ASIC (application-specific integrated circuit).

Further Exemplary Embodiments

Exemplary embodiments of the present disclosure can include a computer readable program product and/or non-transitory storage medium including computer (processor)-readable or executable instructions (and/or corresponding methods) for providing high-accuracy position estimation for mobile user equipment (UE) configured for use within a service area covered by a plurality (or, serving cluster) of ORAN radio units (O-RUs) with known position (e.g., spatial coordinates).

The instructions may include ones for: (a) deriving a channel estimate for a channel between a given UE and each of the plurality of O-RUs in the cluster based on a sounding reference signal (SRS) received from the UE; (b) selecting a subset of the O-RUs, e.g., by applying a selection criterion to the channel estimate in each O-RU for the respective channel to/from the UE; (c) calculating the shortest delay for the given UE in a multipath environment to each O-RU in the subset, forming a set of uplink-time-difference-of-arrival (UL-TDOA) measurements representing the shortest delays to the O-RUs in the cluster; (d) estimating position of the given UE in the service area based on the UL-TDOA measurements; and (e) estimating O-RU synchronization error for each O-RU in the subset using estimated positions of the given UE and corresponding UL-TDOA measurements.

The computer-executable instructions may include a super resolution algorithm for calculating the shortest delay for the given UE in a multipath environment to each O-RU in the cluster/subset. The instructions can include implementing the MUSIC algorithm as such a super resolution algorithm.

The computer-executable instructions may include or provide an unscented Kalman filter (UKF) for determining synchronization error. The UKF may be configured for or provided with inputs including (i) the UL-TDOA measurements for the UE and the subset of O-RUs in the cluster, respectively, (ii) the coordinates of the O-RUs in the subset, and (iii) position estimation of the UE or position of the UE in predefined position that operates in subset of O-RUs for which the UL-TDOA measurements are provided.

The instructions for implementing the UKF may include implementing a state vector and state vector initialization stage. The instructions for implementing the UKF may include calculating sigma points. The instructions for implementing the UKF may include implementing a forecast stage. The instructions for implementing the UKF may include implementing an observation stage. The instructions for implementing the UKF may include implementing a data assimilation stage. The instructions for determining synchronization error can determine the within a range of, e.g., about 1 ns to about 100 ns. The instructions may include selecting a subset of the plurality of O-RUs based on a selection criterion. The instructions may include selecting signal-to-noise ratio (SNR) as a criterion for selecting the subset of O-RUs used for position estimation. The instructions can include selecting the subset of O-RUs with the maximum received SNR value (receiving the $SRS_u$ signal sent by a given $UE_u$) e.g., over a specified threshold value for SNR. The computer-executable instructions can cause removal (or subtraction) of the O-RU synchronization error from the UL-TDOA measurements for determination of UE position.

Accordingly, embodiments of the inventive subject matter can afford benefits relative to prior art techniques. Such benefits may include but are not limited to providing high-accuracy position estimation for mobile user equipment (UE) configured for use within a service area covered by a cluster of ORAN radio units (O-RUs) with known position including coordinates. Position estimation of UEs can be provided with sub-meter accuracy.

Various embodiments of the concepts, systems, devices, structures, and techniques sought to be protected are described above with reference to the related drawings. Alternative embodiments can be devised without departing from the scope of the concepts, systems, devices, structures, and techniques described. It is noted that various connections and positional relationships (e.g., over, below, adjacent, etc.) may be used to describe elements in the description and drawing. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

As an example of an indirect positional relationship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s).

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture, or an article, which comprises a list of elements is not necessarily limited to only those elements but can include other elements not expressly listed or inherent to such apparatus, method, composition, mixture, or article.

Additionally, the term "exemplary" is means "serving as an example, instance, or illustration. Any embodiment or design described as "exemplary" is not necessarily to be construed as preferred or advantageous over other embodiments or designs. The terms "one or more" and "at least one" indicate any integer number greater than or equal to one, i.e., one, two, three, four, etc. The term "plurality" indicates any integer number greater than one. The term "connection" can include an indirect "connection" and a direct "connection".

References in the specification to "embodiments," "one embodiment," "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether explicitly described or not.

Relative or positional terms including, but not limited to, the terms "upper," "lower," "right," "left," "vertical," "horizontal, "top," "bottom," and derivatives of those terms relate to the described structures and methods as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within plus or minus (±) 10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

The disclosed subject matter is not limited in its application to the details of construction and to the arrangements of the components set forth in the following description or illustrated in the drawings. The disclosed subject matter is capable of other embodiments and of being practiced and carried out in various ways.

Also, the phraseology and terminology used in this patent are for the purpose of description and should not be regarded as limiting. As such, the conception upon which this disclosure is based may readily be utilized as a basis for the designing of other structures, methods, and systems for carrying out the several purposes of the disclosed subject matter. Therefore, the claims should be regarded as including such equivalent constructions as far as they do not depart from the spirit and scope of the disclosed subject matter.

Although the disclosed subject matter has been described and illustrated in the foregoing exemplary embodiments, the present disclosure has been made only by way of example. Thus, numerous changes in the details of implementation of the disclosed subject matter may be made without departing from the spirit and scope of the disclosed subject matter.

Accordingly, the scope of this patent should not be limited to the described implementations but rather should be limited only by the spirit and scope of the following claims.

All publications and references cited in herein are expressly incorporated by reference in their entirety.

REFERENCES

[1] 3GPP 38.211, NR; Physical channels and modulation, Rel 16.

[2] 3GPP 36.211, Evolved Universal Terrestrial Radio Access (E-UTRA); Physical channels and modulation.

[3] O-RAN.WG4.CUS.0-v06.00.

[4] Hayes, Monson H., "Statistical Digital Signal Processing and Modeling", John Wiley & Sons, Inc., 1996.

[5] Hua, Yingbo. "Estimating two-dimensional frequencies by matrix enhancement and matrix pencil." IEEE Transactions on Signal Processing 40.9 (1992)

[6] C. Mensing and S. Plass, "Positioning Algorithms for Cellular Networks Using TDOA," 2006 IEEE International Conference on Acoustics Speech and Signal Processing Proceedings, Toulouse, France, 2006, pp. IV-IV, doi: 10.1109/ICASSP.2006.1661018.

[7] Simon Haykin, "Kalman Filtering and Neural Networks", John Wiley & Sons, Ltd, 2001.

What is claimed is:

1. A system for providing high-accuracy position estimation for mobile user equipment (UE) configured for use within a service area covered by a plurality of ORAN radio units (O-RUs) with known position including coordinates, the system comprising:

at least one reference UE in a predefined position;

a memory including non-transitory computer-executable instructions; and a processor coupled to the memory and operative to execute the computer-executable instructions, the computer-executable instructions causing the processor to, (a) derive a channel estimate for a channel between a given UE and:

(i) each of a plurality of O-RUs, and (ii) known data from the at least one reference UE, based on a sounding reference signal (SRS) received from the given UE;

(b) select a subset of the O-RUs and at least one reference UE based on a selection criterion for the respective channel estimates;

(c) calculate shortest delay for the given UE in a multipath environment to each ORU and at least one reference UE in the subset, forming a set of uplink-time-difference-of-arrival (UL-TDOA) measurements representing the shortest delays to the O-RUs and at least one reference UE in the subset;

(d) estimate position of the given UE in the service area based on the UL-TDOA measurements; and (e) estimate O-RU synchronization error for each O-RU and at least one reference UE in the subset using estimated positions of the given UE and corresponding UL-TDOA measurements.

2. The system of claim 1, wherein the at least one reference UE is associated with at least one subset of O-RUs, wherein one reference UE can be associated with more than one subset of O-RUs.

3. The system of claim 1, wherein each at least one reference UE is assigned a weighting relating to accuracy of known location coordinates associated with said reference UE, said weighting being derived from measurement noise covariance R_k in equation:

$$R_{yy} = \sum_{j=0}^{2n} W^j \cdot \left(y_{k-1}^{f,j} - y_{k-1}^{f}\right)\left(y_{k-1}^{f,j} - y_{k-1}^{f}\right)^T + R_{k-1},\ W^j = \frac{1 - W^o}{2n},$$

wherein a lower R_k value indicates a lower noise and thus a higher weighting for said associated reference—UE in said estimate O-RU synchronization error.

4. The system of claim 1, wherein the computer-executable instructions include a super resolution algorithm for calculating the shortest delay for the given UE in a multipath environment to each O-RU and at least one reference UE in the subset.

5. The system of claim 1, wherein the processor is further configured to implement an unscented Kalman filter (UKF) for determining synchronization error.

6. The system of claim 5, wherein the UKF is provided with inputs including (i) the UL-TDOA measurements for the UE and the subset of O-RUs and at least one reference UE in the subset, respectively, (ii) the coordinates of the O-RUs and at least one reference UE in the subset, and (iii) position estimation of the UE or position of the UE in predefined position that operates in subset of O-RUs and at least one reference UE for which the UL-TDOA measurements are provided.

7. The system of claim 6, wherein implementing the UKF comprises implementing a state vector and state vector initialization stage.

8. The system of claim 6, wherein implementing the UKF comprises calculation of sigma points.

9. The system of claim 6, wherein implementing the UKF comprises implementing a forecast stage.

10. The system of claim 6, wherein implementing the UKF comprises implementing an observation stage.

11. The system of claim 6, wherein implementing the UKF comprises implementing a data assimilation stage.

12. The system of claim 1, wherein the O-RU synchronization error is determined within a range of error of about 1 ns to about 100 ns.

13. The system of claim 1, wherein the O-RUs are connected to ORAN distributed units (O-DUs) using an ORAN fronthaul interface.

14. The system of claim 1, wherein the SRS comprises a 3GPP NR/LTE uplink (UL) SRS.

15. The system of claim 1, wherein the O-RU and at least one reference UE is part of a UL-TDOA pairing for UE position estimation.

16. The system of claim 1, further comprising a position estimation framework comprising one or more ORAN distributed units (O-DUs), each connected to one or more O-RUs.

17. The system of claim 16, further comprising a gNB or eNB architecture configured to provide a service area for a plurality of UEs.

18. The system of claim 1, further comprising selecting a subset of the plurality of O-RUs and at least one reference UE based on a selection criterion for determining position of the UE.

19. The system of claim 18, wherein the selection criterion comprises signal-to-noise ratio (SNR).

20. The system of claim 1, wherein the channel estimate comprises one or more channel parameters.

21. The system of claim 1, wherein the processor is connected to or disposed in a gNB or eNB.

22. The system of claim 1, wherein the plurality of O-RUs and at least one reference UE are connected to a common synchronization master clock.

23. The system of claim 1, wherein the computer-executable instructions cause the processor to remove the O-RU synchronization error from the UL-TDOA measurements for determination of UE position.

* * * * *